UNITED STATES PATENT OFFICE.

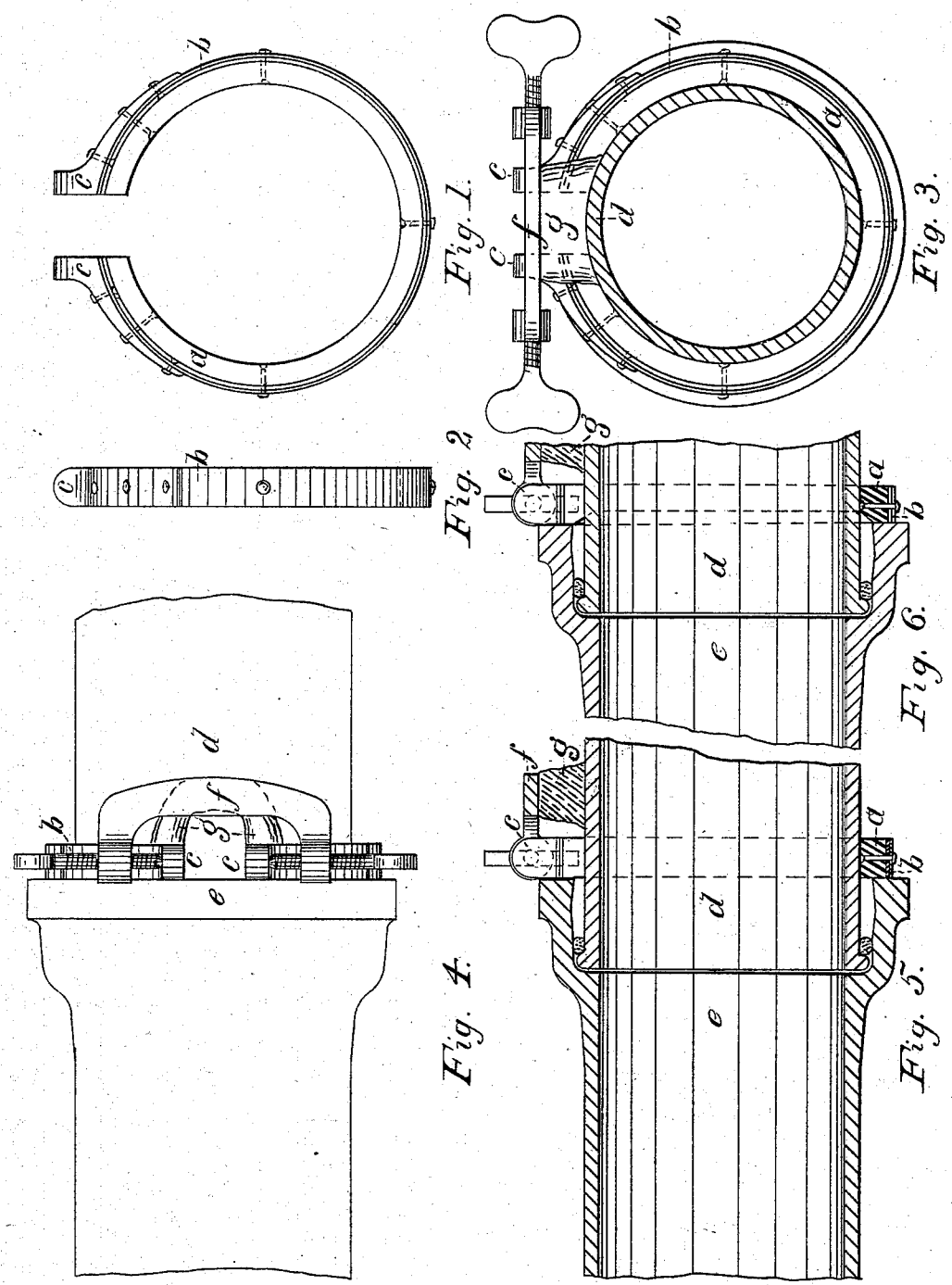

THOMAS WATKINS, OF JOHNSTOWN, PENNSYLVANIA.

DEVICE FOR FILLING PIPE-JOINTS.

SPECIFICATION forming part of Letters Patent No. 274,868, dated March 27, 1883.

Application filed February 7, 1883. (Model.)

*To all whom it may concern:*

Be it known that I, THOMAS WATKINS, of Johnstown, in the county of Cambria and State of Pennsylvania, have invented a certain Improvement in Devices for Filling Joints of Metal Pipe when made with Bell and Spigot, of which the following is a specification.

My invention consists in an improvement in devices for filling joints of metal pipe when made with bell and spigot, to be packed with lead or other soft metal, by furnishing a novel appliance for closing the open end of the bell to confine the fluid metal and hold it in its proper place until it solidifies. This is usually done with a roll of tempered clay or other plastic material—an operation which consumes time, and which is subject to the danger of leakage of the fluid metal in case the pipe is wet, or if from any other cause the clay fails to adhere.

In the drawings accompanying this application, Figure 1 is an end view of my improved steel-bound gasket used in fitting joints. Fig. 2 is a side view of the same. Fig. 3 is a cross-section of pipe fitted with the same. Fig. 4 is a top view of pipe-joints fitted with the same. Fig. 5 is a longitudinal vertical section of pipe-joint and gasket. Fig. 6 is the same, but showing how the shape of gasket may be varied if joint metal is to have a projecting bead.

In the said drawings, *a* is a gasket, made preferably of hemp and rubber packing, or it may be of any other suitable pliable and elastic material. *b* is a thin band of metal, preferably of steel, riveted to the gasket. It is here shown of two thicknesses. *c c* are metallic lugs. *d* is the spigot end of pipe to be fitted or sealed. *e* is the bell end of pipe to be fitted or sealed. *f* is a screw-clamp applied to lugs *c c*. *g* is a gate, formed in the usual way, for pouring the joint.

In using my invention the gasket is slightly washed with a thin clay or other suitable covering to prevent the hot lead from burning it. Thus prepared it is placed around the spigot end of pipe-joint *d* in close contact with bell end of pipe-joint *e*, except at the top, where it does not meet. The screw-clamp *f* or other suitable device is used to put a tension on the gasket, which is thus compressed strongly around the spigot end of the pipe, and the metal band *b* squeezing out the gasket *a* sidewise, the hemp and rubber packing comprising the same is forced laterally against the bell end of the joint *e*, closing it sufficiently to retain the melted lead. A gate of clay, *g*, is then formed in the opening of the gasket, and the joint is ready for pouring. After the metal has cooled the gasket can be removed and again used in the same manner.

It will be found in practice that this invention effects a material saving of time and material, and a single gasket may be repeatedly used.

I am aware that a soldering-clamp composed of a flexible band slotted at one end and held by frictional contact of set-screws, which are passed through the slot, is old; but a device of this kind cannot be used for filling joints of metal pipes. I am also aware that a ring or clamp made in two parts and hinged together at its center, and containing a flexible and elastic packing-ring, and having its ends drawn together by a set-screw, is not new, and this I disclaim. My invention differs from this in having simply a flexible band, which tightens around the pipe equally on all sides and cannot spring outward from the sides of the pipe, as when made in two parts and hinged together.

Having thus described my invention, what I claim, and desire to secure by Letters Patent, is—

The combination of a rubber gasket, *a*, and flexible band *b*, provided with the lugs *c*, with the clamp *f*, and set-screws which are passed through the clamp and made to bear against the lugs, the space between the ends of the gasket being closed by a filling, *g*, of suitable material while the joint is being formed, substantially as shown and described.

THOMAS WATKINS.

Witnesses:
CYRUS ELDER,
JAMES M. SWANK, Jr.